United States Patent [19]

Hetson

[11] 4,155,887

[45] May 22, 1979

[54] STABILIZED INSULATING LATEX PAINT COMPOSITION AND METHOD OF MANUFACTURE

[76] Inventor: George W. Hetson, 2100 Linwood Ave., Fort Lee, N.J. 07024

[21] Appl. No.: 875,914

[22] Filed: Feb. 7, 1978

[51] Int. Cl.$^2$ .............................................. C08L 5/00
[52] U.S. Cl. ..................... 260/17.4 SG; 106/193 R; 106/204; 260/3; 260/13; 260/15; 260/16; 260/17 R; 260/17.3; 260/17.4 BB
[58] Field of Search ...... 260/17.4 SG, 17 R, 17.4 BB, 260/3, 13, 15, 16, 17.3; 106/193 R, 204

[56] References Cited

U.S. PATENT DOCUMENTS

| | | | |
|---|---|---|---|
| 3,067,153 | 12/1962 | Hock et al. | 260/17.4 SG |
| 3,429,840 | 2/1969 | Lowe et al. | 260/15 |
| 3,477,969 | 11/1969 | Parker | 260/17.4 SG |
| 3,652,313 | 3/1972 | Nagata et al. | 106/193 R |
| 3,870,664 | 3/1975 | Faulkner | 260/17.4 SG |
| 3,985,692 | 10/1976 | Sykes et al. | 260/3 |
| 4,059,547 | 11/1977 | Speakman | 260/17 R |

*Primary Examiner*—Maurice J. Welsh
*Attorney, Agent, or Firm*—Darby & Darby

[57] ABSTRACT

Disclosed herein is a latex coating composition containing from 10 to 30% by weight of a porous particulate material such as perlite and from 2 to 4% by weight of a stabilizer blend comprising from 20 to 65% by weight of said blend of a biosynthetic polysaccharide, from 35 to 80% by weight of said blend of a finely divided inorganic filler and from 0 to 35% by weight of a cellulosic agent. The coating composition exhibits excellent insulating properties and does not shrink during storage. The method of preparing the paint composition is also disclosed.

26 Claims, No Drawings

STABILIZED INSULATING LATEX PAINT COMPOSITION AND METHOD OF MANUFACTURE

This invention relates to latex coating compositions. More specifically, the invention relates to textured insulating paint compositions containing porous particulate filler material and a stabilizer including a biosynthetic polysaccharide.

It has long been a goal of the paint industry to incorporate finely divided divided porous materials into latex paint compositions for the purpose of creating a decorative paint coating that would exhibit thermal insulating properties on application to a substrate. Specifically, the industry has sought to incorporate perlite and/or vermiculite particles into a latex paint composition which could be sold to the consumer in ready-mixed form and would not require the addition of any further ingredients prior to application. Heretofore, this has not been possible because the presence of perlite or vermiculite causes the aqueous paint composition to shrink or contract in volume during storage. While this shrinkage is perceived by the consumer as a loss of paint volume, it can also be measured as an increase in density. As employed in this context, the term "shrinkage" refers to the instability of the paint composition in the presence of porous particles. This shrinkage in volume can amount to 10 or 20% or more of the paint's volume and can occur over a relatively short interval (e.g. between the time the paint is loaded into the can and the date of purchase by the consumer). Thus, a one gallon container which has been filled to capacity during manufacturing may lose 10 to 20% of its volume by the time it reaches the consumer. This loss of volume termed "can shrinkage" has been found to be due to the gradual penetration of the porous materials by the latex paint composition.

In an effort to overcome the can shrinkage problem, the industry has adopted the practice of selling a predetermined quantity of finely divided porous material to be admixed by the consumer with a predetermined quantity of paint just prior to application. This solution has several drawbacks. Most consumers do not have the means available to make a uniform admixture of the porous materials and the paint. This in turn results in a lumpy emulsion which is difficult to apply. Moreover, the final coating is not satisfactory from the aesthetic standpoint since it is rarely uniform. Because the coating is not uniform, its insulating value is irregular and varies from point to point. Finally, the on site admixture is also subject to the same can shrinkage problem and the preparation cannot be left standing for any significant period of time without some loss of volume.

It has now been unexpectedly discovered that a water based paint composition exhibiting excellent insulating, can shrinkage and application properties can be achieved by incorporating from 10 to 30% by weight of the paint composition of a finely divided porous material (such as perlite or vermiculite) and from 2 to 4% by weight of the paint composition of a stabilizer blend comprising from 20 to about 65% by weight of said blend of a water soluble biosynthetic polysaccharide, from about 35 to about 80% by weight of said blend of finely divided solid particles having thixotropic properties and from about 0 to about 35% by weight of said blend of a cellulosic agent. By employing the foregoing stabilizing blend, the shrinkage problem encountered with perlite or vermiculite containing ready mixed latex paints, is overcome. Moreover, the resulting paint composition has excellent storage stability, adhesion, color acceptance and retention and ease of application. It has also been discovered that the textured paint coatings produced with the present invention have "R" (insulation) factors (heat transmission through a surface) of 1 or more according to ASTM specification C177 and additionally display excellent flexibility and resistance to cracking, chipping and peeling. Unlike most textured paints, the porous particle containing water based paints of the present invention can be applied in a one step application.

The present invention also embraces a process for producing shrinkage resistant textured latex paints containing finely divided porous materials. In the process, the surface tension of water is lowered to a predetermined level by the sequential addition of water soluble organic and/or inorganic surfactants or similar agents which act to reduce the surface tension of water. The porous materials are admixed with the low surface tension aqueous liquid under constant stirring to form an aqueous slurry and permit essentially complete penetration by the fluid of the voids or pores in the particulate material. The particle containing composition is stabilized with a stabilizing blend comprising a polysaccharide and a finely divided thixotropic material. The stabilized liquid admixture is then combined with a film forming binder to form a paint composition.

It is accordingly an object of the present invention to provide a textured, insulating latex paint composition containing finely divided porous particles.

Another object of the present invention is to provide an insulating latex paint composition containing finely divided porous particles and having a stable density.

An additional object of the invention is to eliminate shrinkage of latex paint compositions containing porous solids such as perlite or vermiculite.

A further object is to provide a stabilizing blend for ready mixed latex paint compositions containing porous solids which eliminates can shrinkage.

An additional object of the invention is to provide a process for manufacturing ready mixed, textured, insulating latex paints containing porous solids.

By employing the polysaccharide containing stabilizer blend disclosed herein in latex paint compositions containing porous solids, it is possible to eliminate shrinkage of the paint composition on storage without sacrificing application characteristics. This is particularly surprising since the ingredients of the stabilizer blend have in the past been used as thickening agents in latex paints and would not normally be added to an aqueous paint composition containing a substantial quantity of porous solids such as perlite or vermiculite. The density of the latex paint compositions of the present invention is essentially stable and does not vary significantly after manufacture. The latex coating compositions of the present invention, can be applied easily, flow smoothly and provide excellent paint films possessing substantially uniform insulating properties across their surface area.

The quantity of stabilizer blend employed is dependent upon the formulation of the particular latex paint to which it is added. In general, amounts ranging from about 2% to about 4% (based upon the total weight of the insulating latex paint composition) have been found to provide desirable results although between about $2\frac{1}{2}$ and $3\frac{1}{2}$% by weight is preferred. In an especially preferred embodiment of the present invention, 3.2% by weight of the total latex paint composition of a stabilizing blend containing 25% by weight of the blend of a polysaccharide, 27% by weight of the blend of a cellulosic stabilizer and 48% by weight of the blend of needlelike particles of colloidal magnesium aluminum silicate is employed.

The stabilizing blend of the present invention contains from about 20 to about 65% by weight of saccharide, from about 35 to about 80% by weight of a finely divided particulate material having thixotropic properties and from 0 to about 35% by weight of the blend of a cellulosic agent. The saccharide agents are preferably biosynthetic polysaccharides produced by the fermentation of one or more carbohydrates with bacteria of the genus xanthomonas. Representative of these bacteria are xanthomonas campestris, xanthomonas phaseoli, xanthomonas mulvacearn, xanthomonas carotae, xanthomonas translucens, xanthomonas hederae and xanthomonas papavericoli. Particularly preferred for use in the invention is a xanthan biosynthetic polysaccharide available from York Castor Oil Company as WT5100 in which the xanthan is a hetero polysaccharide containing D-glucose, D-mannose and D-glucuronate in the molar ratio of 2.8:2.0:2.0. Suitable carbohydrate source material for preparing the polysaccharide stabilizers useful in the present invention with the above-mentioned organisms include, without limitation, succrose, D-xylose, D-mannose, D-glucose (dextrose), L-arabinose, D-galactose, D-fructose, maltose, D-melezitose, raffinose, methyl beta-maltoside, trehalose, cellobiose, L-rhamnose, cellulose and xylan or mixtures of them. The polysaccharides may be prepared using conventional aqueous fermentation techniques and optional nutrients.

Saccharide constituents, e.g., succrose, mannose, and the like may also be used alone or in conjunction with the polymeric saccharide stabilizers. Also useful are mono di and triglycerides and combinations of them. Generally, the saccharide or polysaccharide stabilizing agents may be characterized as odorless, free-flowing powders which are soluble in water with stirring to give viscous solutions at low concentrations.

While the saccharide constituents may comprise from 20–65% by weight of the stabilizer blend, they preferably are present in the ranage of 20–40% by weight of the blend. In a particularly preferred embodiment of the invention they comprise 25% by weight of the stabilizer blend and are present in the form of WT-5100 (York Castor Oil Co.).

A further ingredient of the stabilizing blend is one or more particulate inorganic thixotropic thickening additives. Suitable materials are generally derived from mineral clays such as attapulgite. The preferred material is a needle-like colloidal magnesium aluminum silicate (Attapulgus clay) available as Attagel 50 (Engelhard Co.). Also suitable in this regard are finely divided asbestos fibers, clay-type gelant thickeners such as those available from N.L. Industries as Bentone LT, and hydrous magnesium aluminum silicate containing small quantities of asbestos fibers (sold as Wollastinite). Although the finely divided particulate thixotropic additive can comprise from about 35 to about 80% by weight of the stabilizer blend, it is preferably employed in the range of 40% to about 50%. In one especially preferred embodiment of the invention, the stabilizer blend comprises 48% by weight of colloidal particles of magnesium aluminum silicate.

Optionally, the stabilizing blend may also include one or more cellulosic agents such as hydroxy propylmethyl cellulose, hydroxy ethyl cellulose, hydroxy methyl cellulose, carboxy ethyl cellulose, carboxy methyl cellulose, methyl cellulose, and similar cellulosic additives. A particularly preferred cellulosic material is available from Dow Chemical Company as K15MDGS (hydroxy propyl methyl cellulose). The cellulosic agents of the invention are optional ingredients of the stabilizer blend, and may comprise from 0–35% by weight of the blend, but preferably between about 20 and about 30% by weight of the blend. In a particularly preferred embodiment of the invention, the stabilizer blend includes 27% by weight of hydroxy propyl methyl cellulose.

The ingredients in the stabilizer blend may be combined in advance for use in the present invention or alternatively the blend may be prepared in situ by sequentially adding the respective ingredients to the aqueous dispersion of porous solids during the manufacturing operation.

In one particularly preferred embodiment of the present invention, an insulating latex paint composition is prepared containing 3.2% by weight of a stabilizer blend consisting essentially of 25% xanthan biosynthetic polysaccharide (WT5100 York Castor Oil Company), 27% of hydroxy propyl methyl cellulose (Dow Chemical K15MDGS) and 48% by weight of Attapulgus clay (Attagel 50-Engelhard Industries). It will be appreciated that the exact composition of the stabilizer blend may be varied within the stated ranges depending upon the amount of porous solids to be employed in the paint composition and the specific application and coating properties desired in the final composition.

The porous solids useful in the present invention may be characterized as finely divided particles of water insoluble porous materials. Suitable particles (which may range in size from about 200 mesh to about ⅛ in. in diameter) include perlite, vermiculite, styrofoam and expanded resin beads (e.g., polystyrene) formed by expanding thermoplastic substances by heating. The preferred porous material for use in the invention is perlite. It will be appreciated that the aggregate materials suitable for use in the present invention are highly porous, containing many microscopic voids extending from their surface to the interior of the particle. As part of the present invention it has been discovered that gradual penetration of latex paint compositions into the microporous voids occurs when the paint composition is allowed to stand for a period of time (e.g., on storage). This is perceived by the consumer as a loss or diminuition in paint volume, but may be measured as an increase in the density of the paint composition. The present invention overcomes this shrinkage problem. Perlite (volcanic glass which is heat expanded) and vermiculite (hydrous silicate which is expanded at high temperatures to give a light weight highly water absorbent material which does not burn and is water insoluble) are are desirable inorganic porous materials for use in the present invention. It will be appreciated that as the pores in such materials are penetrated by the latex paint composition of the present invention (which drys on application to a substrate), small air pockets are formed. These air pockets provide the insulating character of the latex paint composition.

The agents which may be used to lower the surface tension of water prior to addition of porous aggregate will be selected from amongst those well-known in the art. Suitable agents include compositions known as defoamers as for example kerosene, pine oil, octyl alcohol, tributyl phosphate, and the like.

Anionic and non-ionic surfactants may also be used to lower surface tension of water and as surfactants in the paint compositions of the present invention. Among the anionic surfactants found to be useful are the sulfated or sulfonated ethers of long and short chain aliphatic groups (e.g., $C_{17}H_{33}$—O—$C_2H_4$—$SO_3$—$N_a$), or ($C_{17}H_{33}$—O—$C_2H_4$—O—$SO_3$—$N_a$) sulfonated alkyl esters of long chain fatty acids

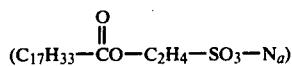

sulfonated glycol esters of long chain fatty acids, sulfonated alkyl substituted amides of long chain fatty acids, alkylated aryl sulfonates (dodecyl benzene sodium sulfonate), hydro aromatic sulfonates (tetrahydronaphthalene sodium sulfonate), and alkyl sulfosuccinates (dioctyl sodium sulfosuccinate), alkyl sulfonates (dodecyl sodium sulfonate), alkyl sulfates (sodium oleyl sulfate), and soaps such as sodium laurate, ammonium stearate and diethanol-ammonium oleate. Useful non-ionic surface active agents include mono ethers of poly glycol with long chain fatty alcohols such as the reaction products of ethylene oxide or polyethylene glycol with long chain fatty alcohols, monoesters of poly glcyols with long chain fatty acids, including reaction products of ethylene oxide or polyethylene glycol with long chain fatty acids, partial esters of polyhydric alcohols with long chain monocarboxylic acids (glycerol monostearate, sorbitan trioleate), and partial and complete esters of long chain monocarboxylic fatty (and/or resinous) acids with polyglycol ethers or polyhydric alcohols (e.g., tristearate acid ester of polyglycol ether of sorbitan).

The surfactants and/or defoamers are at least partially soluble in water and act to lower the surface tension of water to a point beneath its normal level, i.e. 73 dynes/cm. at 25° C. The quantity and strength (i.e. effectiveness in reducing surface tension of water) of the individual surfactant and defoamers employed in the compositions of the present invention are not critical and may vary widely, however, a sufficient amount of surfactants and/or defoamers must be employed to lower the surface tension of the make-up water in which the porous solids are dispersed to within the range of about 10 dynes/cm. to 40 dynes/cm., and preferably 25 dynes/cm (at 25° C.). The preferred surface tension lowering agents for use in the present invention are a blend of non-ionic surfactants in mineral oil and are available as Colloids 677, Colloids 691 (Colloid Chemical Company) and Troy 99 (Troy Chemical Co.). As outlined above, the defoaming agents are used to lower the surface tension of water sufficiently to enable it to penetrate completely into the interior voids of the porous aggregate. The type, quantity, and surface tension lowering ability of a particular agent used in the invention is not critical, so long as a sufficient quantity of one or more such agents is employed to permit essentially complete penetration of water into the furthest recesses of the interior void spaces of the porous aggregate. The requisite surface tension lowering effect may be achieved using a single defoaming agent or surfactant, or a combination of such agents. If a combination of agents is used, they may be admixed with one another and incorporated batch-wise in water, or alternatively, they may be added to water sequentially. In the process of the present invention, the sequential addition of surfactants is preferred, beginning with addition of the surface active agent having the least surface tension lowering effect and progressing to the more powerful agents (i.e., those having greater surface tension lowering effects on water) if more than one agent is used.

The coating compositions of the present invention may also contain one or more film forming binders. As used herein, the term "film-forming binder" is intended to embrace those water soluble or water dispersible film-forming resins conventionally employed in latex paint compositions. These include aqueous colloidal dispersions of polymers from the polymerization of monomers such as acrylic acid, methacrylic acid, methylmethacrylate, ethylmethacrylate, ethylhexylacrylate, tetrafluoroethylene, chlorotrifluoroethylene, vinylidene fluoride, butadiene-1-3, isoprene, chloroprene, styrene, nitriles, acrylamide, vinyl alcohol, methacrylamide, acrylonitrile, vinyl chloride, vinyl acetate, vinylidene chloride, ethylene, propylene and isobutylene; drying oil fatty acid compounds such as tuna oil, linseed oil, scybean oil, dehydrated castor oil, cottonseed oil, poppyseed oil, safflower oil, and sunflower oil; fatty acids derived from drying oils; partially polymerized drying oils such as partially polymerized linseed oil; oxidized drying oils such as oxidized soybean oil, synthetic drying oils obtained by the esterification of fatty acids with polyhydric alcohols (e.g., glycerol pentaerythritol, mannitol and sorbitol); drying oil—alkyd resins of the type obtained by reacting a drying oil fatty acid with polyhydric alochol and a polycarboxylic acid such as maleic andhydride, fumaric acid, phthalic acid, adipic acid, sebacic acid, and the like; latices of chlorinated and natural rubbers, the polysufides, epoxides, amino resins such asurea-formaldehyde, melamineformaldehyde, Nitcocellulose, ethyl cellulose, cellulose butyrate, chlorinated poly ethers, terpene resins, chlorosulfonated polyethylene natural rubber, organo siloxane polymers, as well as other film-forming binders employed in water based paints.

Suitable commercially available polymeric latex formulations generally contain from about 40 to about 60 weight percent of an emulsified polymer and include by way of non-limiting example, natural rubber, styrene-butadiene copolymer, butadiene-acrylonitrile copolymers, polyvinyl chloride, polyvinyl acetate, copolymers of vinylidene chloride and acrylonitrile, polytetrafluoroethylene, ethylacrylate-methacrylate copolymers, butadiene-styrene-acrylonitrile copolymers, isobutylene-isoprene copolymers, acrylonitrilebutylacrylatemethacrylic acid copolymers, styrene-butyl acrylateacrylic acid copolymers, copolymers of styrene, acrylonitrile, octyl acrylate and methacrylic acid, copolymers of methyl methacrylate, ethyl acrylate and ammonium methacrylate.

The textured paint compositions of the present invention may include colored or white pigments including mineral products which are used as fillers and extenders. Among the pigments suitable for incorporation in the present invention are the various water insoluble organic and inorganic paint pigments including by way of nonlimiting example, titanium dioxide, zinc oxide, phthalocyanine blue and green, lead chromate, barium sulfate, zinc sulfide, silica, calcium carbonate, molybdate oranges, chrome green, iron blues, magnesium silicate (talc) and iron salts of nitroso compounds. Hanso yellows, di-nitraniline oranges, permanent red 2B types and others in various combinations and preparations. Pigment dispersing agents including tetrasodium pyrophosphate, lecithin, gum arabic, sodium silicate, various water soluble soaps, aliphatic and aromatic sulfonates, sulfolignins, the aliphatic sulfates, various polyethers and ether alcohol concentrates and the like may be added to enhance the dispersion of the pigments.

Additives of the type conventionally used in latex paint compositions may also be incorporated in the insulating textured latex paints of the present invention. These include freeze-thaw stabilizers such as ethylene glycol, propylene glycol, glycol ethers, alkali metal salt of N-coco beta amino butyric acid, poly substituted phenolates, modified glyceryl monoricinoleate, urea and thiourea; coalescing agents including diethyleneglycol ethyl ether, diethylene glycol ethyl ether acetate, hexylene glycol, and 2-butoxyethanol acetate (butyl Cellosolve); bacteriocides and fungicides including halogenated acetylene alcohols, diphenyl mercuric dodecenyl succinate, O-phenylphenol and its sodium salt, tri-chlorophenols and their sodium salts.

The method of manufacturing the paint cmpositions of the present invention will be illustrated in the following example which describes the preparation of an especially preferred textured insulating latex paint according to the present invention.

EXAMPLE I

A textured polyvinyl acetate latex paint containing perlite is prepared by adding into the bowl of a slow speed high torque paste mixer 77 gallons (641.4 pounds) of water and ½ gallon (4.78 pounds) of Troysan 174 an antifungal agent (Troy Chemical Co.). The mixer blade is allowed to rotate continuously at 50 r.p.m. during the paint manufacture. To the water are sequentially added 7/16 gallons (3.24 pounds) of Colloids* 677 (non-ionic surfactant in mineral oil), 7/16 gallons (3.24 pounds) of Colloids* 691 (non-ionic surfactant in mineral oil) and ⅞ gallons (6.30 pounds) of Troy 999 (non-ionic surfactant in mineral oil). These surface active agents lower the surface tension of the water to approximately 25 dynes/cm. and the colloids 677 is added first as it provides the smallest amount of surface tension drop. Stated in other words, the weakest surface tension lowering agent of the group is added first. The objective in adding these compositions is to reduce the surface tension of the water to permit it to penetrate the voids in the porous particles to be added subsequently.
*Colloids Inc.

400 pounds of perlite particles (average particle size approximately 10-20 mesh) is then added slowly to the water-defoamer solution while the mixer continues to operate at about 50 r.p.m. to form an aqueous perlite slurry. Thereafter 2⅝ gallons (22.97 pounds) of dibutyl phthalate (plasticizer) ½ gallon (4.21 pounds) of a non-ionic surfactant (CTA-639 Speco Chemical Company), and ½ gallon (4.6 pounds) of anionic surfactant Tamol 731 (Rohm & Haas) are added slowly to the aqueous perlite slurry. The foregoing surfactants are employed to reduce surface tension for later addition of a pigment composition and may be eliminated if the composition is not to be pigmented. 5/16 gallons (2½ pounds) of water dispersible lecithin is added to the mixture 1-5/16 gallons (10.24 pounds) of A $C_{12}$ ester alcohol used as a coalescing agent (Texanol-Eastman Kodak Company), is then added to the mixer.

The stabilizer blend is then prepared in situ by sequentially adding to the aqueous perlite slurry 16 pounds of xanthan biosynthetic polysaccharide (WT-5100), 17 pounds of hydroxy propyl methyl cellulose (Dow K15MDGS) and 30 pounds of colloidal magnesium aluminum silicate (Attagel 50). 90 pounds of enamel grade chalk resistant titanium dioxide pigment is then added slowly to the mixer bowl. The mixer is operated for a period of about an hour or until the ingredients have become thoroughly and uniformly admixed in the liquid composition to form a textured insulating paste. The paste is extended by admixture with 77 gallons (693 pounds) of vinyl acetate butyl-acrylate emulsion (55% solids) and 4 gallons (33.2 pounds) of water under continuous mixing to form a textured, insulating, surface coating composition according to the present invention. The paint had density of 8.8 pounds per gallon at the completion of manufacture. One gallon of the paint composition was stored in a sealed paint can at ambient (17° C.) temperature for 30 days. The density was again measured and found to be 8.8 pounds per gallon. The volume shrinkage was <2%.

The following insulating paint compositions were prepared according to the process of the present invention.

| Ingredient | Composition A (Pounds) | Composition B (Pounds) | Composition C (Pounds) |
|---|---|---|---|
| Water | 641.4 | 641.4 | 641.4 |
| 1-amino-2 hydroxyethanol Aqueous solution (Troysan 174) | 4.78 | 4.78 | 4.78 |
| Colloids 677 (non-ionic surfactant) | 3.24 | 3.24 | 3.24 |
| Colloids 691 (non-ionic surfactant) | 3.24 | 3.24 | 3.24 |
| Troy 999 (non-ionic surfactant) | 6.30 | 6.30 | 6.30 |
| Perlite aggregate (avg size 10-20 mesh) | 400 | 400 | 400 |
| Dibutylphthalate | 22.97 | 22.97 | 22.97 |
| Non-ionic surfactant (CTA-639) | 4.21 | 4.21 | 4.21 |
| Anionic surfactant (Tamol-731) | 4.6 | 4.6 | 4.6 |
| Water dispersible lecithin | 2.5 | 2.5 | 2.5 |
| $C_{12}$ ester alcohol (Texanol) | 10.24 | 10.24 | 10.24 |
| Xanthan polysaccharide thickener (WT-5100) | 16 | — | 16 |
| Hydroxy propyl methyl cellulose | 17 | 63 | 17 |
| Magnesium aluminum silicate particles | 30 | — | 30 |
| Enamel grade chalk resistant titanium dioxide | 90 | 90 | 90 |
| Polyvinyl acetate emulsion | 693 | 693 | — |
| Water | 33.2 | 33.2 | — |
| Acrylic emulsion (61% solids) | — | — | 645 |
| Propylene glycol | — | — | 34 |
| Density at Manufacture | 8.8 lbs/gal | 8/8 lbs/gal | 8.7 lbs/gal |
| Density 48 hrs after Manufacture | 8.8 lbs/gal | 9.1 lbs/gal | 8.7 lbs/gal |

Example 3

The paint formulations described in Example 2 were used to fill a one gallon can to capacity. The cans were sealed and stored for a period of one month at ambient (17° C.) temperature. At the end of the one month period, each can was opened and the volume contents measured to determine the shrinkage loss (by volume). The volume shrinkage loss in each of compositions A and C was <2%. The volume shrinkage of composition B was >5%.

Example 4

The insulating latex paint composition of Example 1 was applied to a smooth substrate using a brush. Several coatings were applied to build up a total layer thickness of 1 inch. The coating had the appearance of a stucco texture. The insulating value ("R" factor—heat transmission through a surface) of the coating was then tested using the method outlined in ASTM specification C-177. The "R" value of the coating was approximately 2.78.

The insulating paint compositions of the present invention have excellent adhesion, flexibility and can be used to cover unpainted dry walls in a single application. As the insulating compositions dry on a substrate microscopic air cells are formed within the porous materials dispersed in the paint film, consequently enabling the coating to serve as an insulator in addition to performing a decorative function.

What is claimed is:

1. A textured insulating latex paint composition comprising water, a film-forming binder, a porous solid material uniformly dispersed in said composition and a stabilizer blend, said stabilizer blend comprising a polysaccharide and a finely divided inorganic thixotropic additive.

2. The paint composition of claim 1 wherein said stabilizer blend comprises a cellulosic agent.

3. The paint composition of claim 1 wherein said stabilizer blend comprises from 2 to 4% by weight of said paint composition.

4. The paint composition of claim 3 wherein said porous solid material comprises from about 10 to about 30% by weight of said paint composition.

5. The paint composition according to claim 4 wherein said stabilizer blend comprises from about 20 to about 65% by weight of said polysaccharide, from 35 to about 80% by weight of said inorganic additive and from 0 to 35% by weight of a cellulosic agent.

6. The paint composition of claim 5 wherein said polysaccharide comprises a hetero polysaccharide containing D-glucose, D-mannose and D-glucuronate in the molar ratio of about 2.8:2.0:2.0.

7. The paint composition of claim 6 wherein said cellulosic agent is hydroxy propymethyl cellulose.

8. The paint composition of claim 7 wherein said inorganic additive is colloidal magnesium aluminum silicate.

9. The paint composition of claim 8 wherein said stabilizer blend comprises 25% by weight of said hetero polysaccharide, 27% by weight of said hydroxy propylmethyl cellulose and 48% by weight of said colloidal magnesium aluminum silicate.

10. The paint composition according to claim 9 wherein said porous material is perlite.

11. The paint composition according to claim 10 wherein said film-forming binder is a copolymer of butyl acrylate and vinyl acetate.

12. The paint composition according to claim 11 wherein said stabilizer blend comprises from about 2.5 to about 3.5% by weight of said paint composition.

13. The paint composition of claim 12 wherein said stabilizer blend comprises 3.2% by weight of said composition.

14. A textured insulating paint composition comprising a film-forming resin binder, water, a pigment, approximately 20% by weight of perlite, 3.2% by weight of said paint composition of a stabilizer blend comprising 25% by weight of a biosynthetic hetero polysaccharide containing D-glucose, D-mannose and D-glucuronate in the molar ratio of 2.8:2.0:2.0, 27% by weight of hydroxy methyl propyl cellulose, and 48% by weight of colloidal magnesium aluminum silicate said composition having a density of less than 9 pounds per gallon.

15. A method of preparing a textured, insulating surface coating which comprises mixing water with one or more surface tension lowering agents to reduce the surface tension of said water to a predetermined value,
    forming a slurry with said low surface tension water and a porous particulate solid,
    mixing said slurry to permit said water to penetrate throughout the pores of said solid,
    combining said slurry with a stabilizing composition comprising a polysaccharide and a finely divided thixotropic thickening material,
    combining said stabilized aqueous solution with a paint film-forming binder.

16. The method of claim 15 wherein said stabilizing blend includes a cellulosic agent.

17. The method of claim 16 which comprises forming said stabilizing blend, in situ, in said aqueous slurry by sequentially adding the components of said blend to said slurry.

18. The method of claim 16 which comprises combining the constituents of said stabilizing blend separately and prior to admixing said blend with said aqueous slurry.

19. The method according to claim 17 wherein said stabilizing blend comprises from about 20 to about 65% by weight of said polysaccharide, from about 35 to about 80% by weight of said finely divided thixotropic solid, and from 0 to about 35% by weight of said cellulosic agent.

20. A method of stabilizing the density of a latex paint composition containing a porous finely divided solid material dispersed in a composition comprising a film-forming binder, water and a pigment which comprises incorporating in said composition a stabilizing blend containing from about 20 to about 65% by weight of said blend of a xanthan polysaccharide, from about 35 to about 80% by weight of said blend of a finely divided inorganic thixotropic particulate solid, and between 0 and about 35% by weight of said blend of a cellulosic agent.

21. A stabilizer blend for a latex paint composition containing porous particulate materials which comprises from about 20 to about 65% by weight of a xanthan polysaccharide, from about 35 to about 80% by weight of a finely divided thixotropic solid, and 0 to about 35% by weight of a cellulosic agent.

22. The paint composition according to claim 9 wherein said porous material is vermiculite.

23. The paint composition according to claim 1 wherein said porous material comprises finely divided particles of a water insoluble material having a particle size between 200 mesh and about ⅛ inch.

24. The paint composition according to claim 1 wherein said porous material comprises expanded resin beads.

25. The paint composition according to claim 5 which further comprises a pigment.

26. The paint composition of claim 5 wherein said film forming binder comprises a water soluble or water dispersible film forming resin.

* * * * *